United States Patent [19]

Esman

[11] Patent Number: 5,561,546
[45] Date of Patent: Oct. 1, 1996

[54] METHOD AND APPARATUS FOR IMPROVING THE SENSITIVITY OF OPTICAL MODULATORS

[75] Inventor: Ronald D. Esman, Burke, Va.

[73] Assignee: The United States of America as represented by the Secretary of the Navy, Washington, D.C.

[21] Appl. No.: 405,642

[22] Filed: Mar. 17, 1995

[51] Int. Cl.$^6$ .................................................. G02F 1/03
[52] U.S. Cl. ............................ 359/245; 385/2; 359/276
[58] Field of Search .................................... 359/245, 276; 385/2; 356/350

[56] References Cited

U.S. PATENT DOCUMENTS

| | | | |
|---|---|---|---|
| 4,968,110 | 11/1990 | Bulmer et al. | 350/96.14 |
| 5,303,314 | 4/1994 | Duling, III et al. | 385/11 |
| 5,446,573 | 8/1995 | Lomashevitch et al. | 359/158 |
| 5,495,359 | 2/1996 | Gertel et al. | 359/245 |

OTHER PUBLICATIONS

Esman et al., "Wideband Efficiency Improvement of Fiber Optic Systems By Carrier Subtraction", *IEEE Photonics Tech. Ltrs.*, vol. 7, pp. 218–220, Feb. 1995.
Stokes et al., "All Single-Mode Fiber Resonator", *Optics Ltrs.*, vol. 7, No. 1, pp. 288–290, Jan. 1982.
Yue et al., "Fibre Ring Resonator With Finesse of 1260", *Elect & Ltrs.*, vol. 24, No. 10, pp. 622–623, May 1988.
Aqrawal et al., "Long–Wavelength Semiconductor Lasers", *Van Norstrand Reinhold 6*, New York, N.Y., 1989.
Kawasaki et al., "Narrow–Band Bragg Reflectors In Optical Fibers", *Optical Ltrs.*, vol. 3, No. 2, pp. 66–68, Aug. 1978.
Archambault et al., "100% Reflectivity Bragg Reflectors Produced In Optical Fibers By Single Excimer Laser Pulse", *Elect. Ltrs.*, vol. 29, No. 5, pp. 453–455, Mar. 1993.
Koqa et al., "High–Isolation Polarization–Insensitive Optical Circulator For Advanced Optical Communications Systems", *J. of Lightwave Tech.*, vol. 10, No. 9, pp. 1210–1217, Sep. 1992.
Farwell et al., "Increased Linear Dynamic Range Y Low Biasing The Mach–Zehnder Modulator", *IEEE Photonics Tech., Ltr.*, vol. 5, pp. 779–782, Jul. 1993.
Scott et al., "High Modulation Effiency of Intracavity Contacted Vertical Cavity Laser", *Appl. Phys. Lett.65(1)*, pp. 1483–1485, Sep. 1994.

*Primary Examiner*—Mark Hellner
*Attorney, Agent, or Firm*—Thomas E. McDonnell; Charles Stockstill

[57] ABSTRACT

An intracavity-modulated laser includes a gain element, an electro-optic modulator (EOM), a frequency selective coupler (FSOC), and an optical isolator coupled in such a way that a ring laser cavity is formed. The EOM selectively affects the optical input in intensity, phase, or frequency according the radio frequency (RF) input signal applied. The FSOC is a three-port device that receives light at a first port and passes narrowbands of light out a second port and directs the remaining optical spectrum out a third port. The optical isolator assures single direction lasing. When the gain is sufficient to overcome the ring losses, the laser cavity will oscillate with longitudinal modes corresponding to the pass bands of the FSOC. The light exiting the second port of the FSOC is amplified by the laser gain element and is directed to the EOM. The EOM modulates each carrier (longitudinal mode) of the laser cavity thereby creating optical modulation sidebands associated with each carrier. The FSOC selectively couples the modulation sidebands out of the laser cavity. Since the FSOC contains no active elements, the frequency selective coupling operation is essentially noise-free. In this way an optical source is formed which can be modulated to frequencies limited only by the EOM bandwidths, reduces the RF input voltages required to produce a given modulation depth, effectively couples out only the modulation of the longitudinal modes allowing efficient use of optical components, and improves system performance without adding noise.

11 Claims, 2 Drawing Sheets

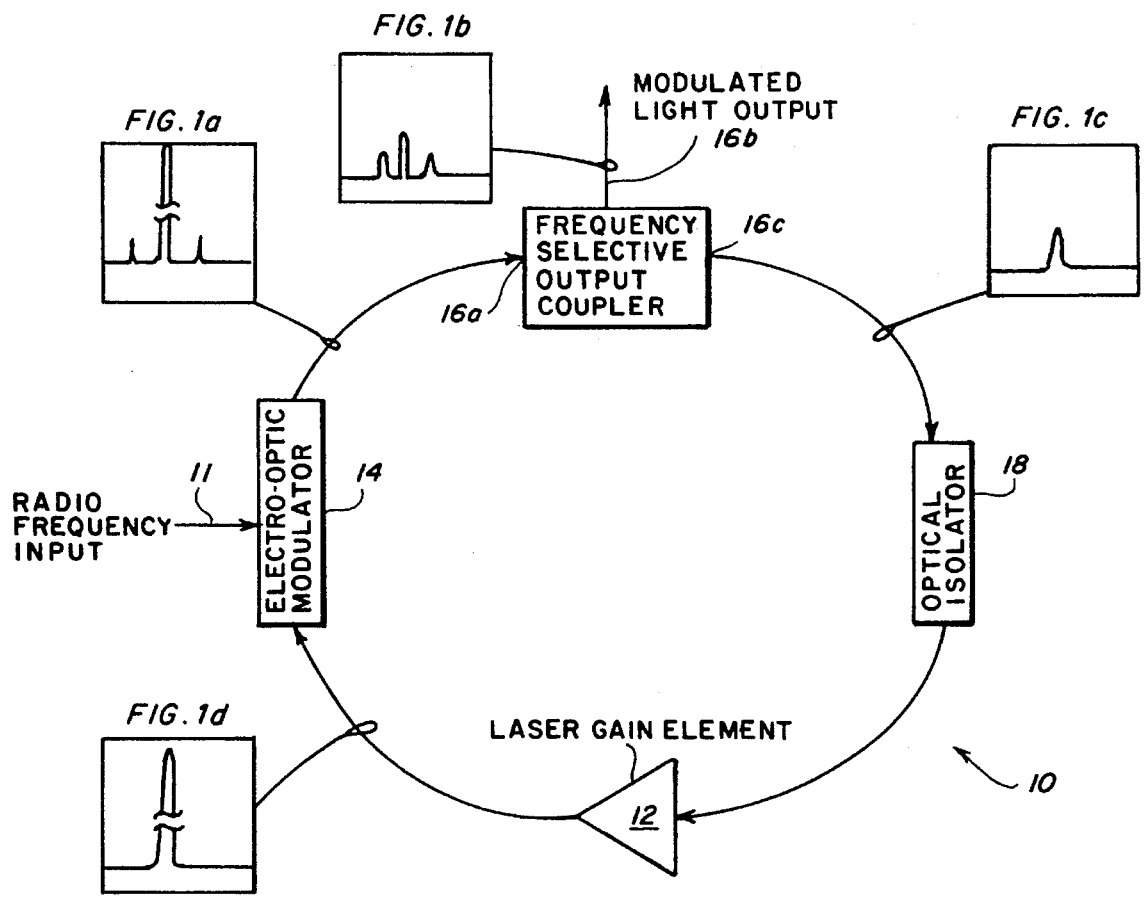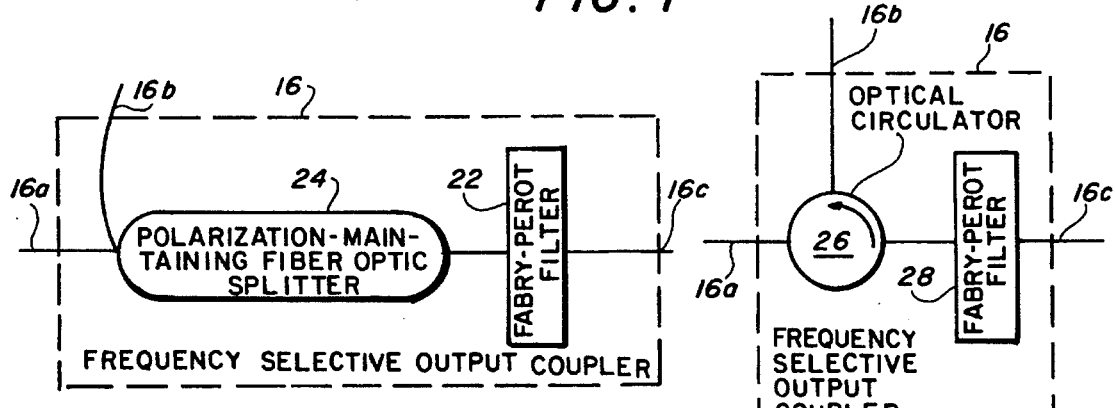

5,561,546

METHOD AND APPARATUS FOR IMPROVING THE SENSITIVITY OF OPTICAL MODULATORS

BACKGROUND OF THE INVENTION

1. Field of the Invention

This invention deals with optical modulation, more particularly to a method and apparatus for modulating optical carriers with relatively weak electrical, acoustic, magnetic or similar energy sources.

2. Description of the Related Art

The modulation efficiency of electro-optic optical modulators has a direct impact on the efficiency of optical systems that process radio frequency, microwave, and millimeter-wave signals (collectively referred to here as electrical signals). Here, processing of electrical signals refers to, but is not limited to, the following: point-to-point transmission, communications networks, delay or storage, distribution, and phased array beamforming. Most modulators exhibit large switching (on-off) voltages, therefore, small input electrical signals have little effect on the transmitted optical carrier. The modulated output then consists of a strong unmodulated optical carrier with very weak signal sidebands.

In general, the electrical signal power and signal-to-noise ratio carried by an optical carrier is proportional to the optical power. Thus, in most devices, high optical power levels are desirable. However, weakly modulated optical waves (those having small modulation indices) leave significant unmodulated power in the original carrier. Hence, despite a high average optical power needed to increase the electrical signal power, the electrical signal power carried may remain quite small. The excess optical power is detrimental in at least two ways. First, optical amplifiers are limited by the average output power; therefore, amplifiers will have limited use to boost the weakly modulated optical wave. Second, and more importantly, the average optical power must be currently kept below ~2 mW to a) avoid signal reductions and distortions in high-speed photodetectors and b) to avoid damage to the photodetector. Improvement in photodetector power handling ability (by new design or choice) will extend the power limit; but excess optical power is still expected.

SUMMARY OF THE INVENTION

An object of this invention is to improve upon the modulation of a continuous wave (CW) optical signal by an electro-optic device.

This invention is concerned with sensing, transmission, and processing of electrical signals using an optical carrier. An apparatus is provided by this invention that reduces the unmodulated carrier power so that optical amplifiers can be used to increase the optical signal and allow more useful input optical powers to be detected by the photodetector (PD) or any other means for optical to electrical conversion. In particular, this invention efficiently modulates an optical carrier with relatively weak input electrical signals by presenting a technique to obtain optical modulation sidebands with a substantial reduction of the optical carrier. High internal circulating laser power yields high input optical power to a laser intracavity modulator, which leads to sidebands with higher power. Simultaneously, modulation sidebands are selectively extracted from the laser cavity yielding an optical signal with reduced optical carrier. The net effect is a dramatically improved sensitivity to the input electrical signal.

BRIEF DESCRIPTION OF THE DRAWINGS

FIG. 1 shows an optical modulation system.

FIG. 1a shows the optical spectrum at the input port of the frequency selective output coupler.

FIG. 1b shows the optical spectrum at the first output of the frequency selective output coupler.

FIG. 1c shows the optical spectrum at the second output port of the frequency selective output coupler.

FIG. 1d shows the optical spectrum at the output of the polarization maintaining laser gain element.

FIG. 2 shows a frequency selective output coupler utilizing a fiber-optic splitter and a Fabry-Perot filter.

FIG. 3 shows a frequency selective output coupler utilizing an optical circulator and a Fabry-Perot filter.

DESCRIPTION OF THE PREFERRED EMBODIMENT

Figure 4:
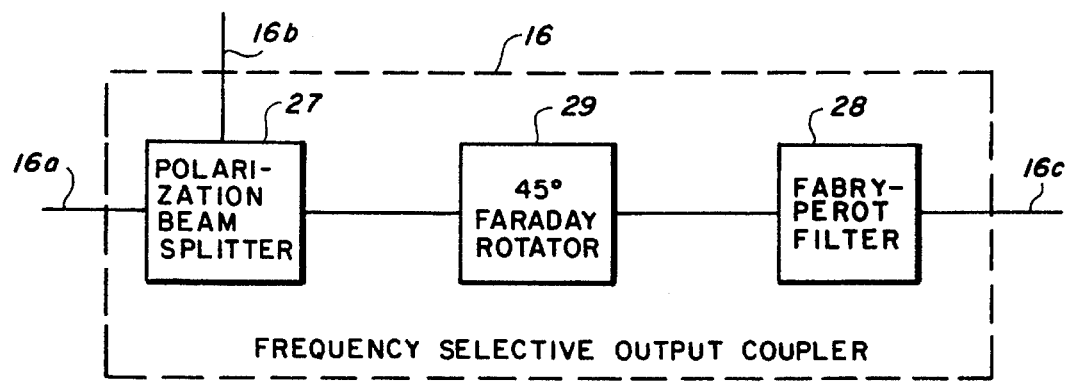
FIG. 4 shows a frequency selective output coupler utilizing a polarization beam splitter in conjunction with a 45° Faraday rotator and Fabry-Perot Filter.

In general, the electrical signal power and signal-to-noise ratio carried by an optical carrier is proportional to the optical power. Thus, high optical power levels are desired in the system. However, weakly modulated optical waves (those having small modulation indices) leave significant unmodulated power in the original carrier. Hence, despite a high average optical power needed to increase the electrical signal power, the electrical signal power carried remains quite small. The excess optical power is detrimental in that, first, optical amplifiers are limited by the average output power; therefore, amplifiers will have limited use in boosting the weakly modulated optical wave. Secondly, the average optical power must be kept below ~2 mW to avoid signal reductions and distortions in the photodetectors (PDs) and to avoid damage to the PDs. High-speed PDs having (3 dB) frequency response beyond 5 GHz are especially sensitive to high power since they have characteristically small active volumes to reduce device capacitance and charge carrier transit times.

Processing of electrical signals by an optical carrier can be accomplished in many ways, this invention improves upon the apparatus where a continuous wave (CW) optical signal is being modulated by an electro-optic device—conventionally used external to a laser cavity—since external modulation often leads to poor modulation depths. In general, optical modulators transduce electrical, acoustic, magnetic, or similar energy into modulated optical signals by modulating the intensity, phase, frequency, or polarization of an optical carrier. In this instance only optical intensity modulation by an electrical energy is considered, however, other types of weak modulation by other types of energy can be enhanced by the techniques taught herein.

In the conventional externally modulated optical communications link a CW optical signal is modulated by an electro-optic modulator; for example, the optical intensity throughput of a Mach-Zehnder modulator depends sinusoidally on the input electrical signal. For linearity and maximum differential change (modulation) in optical output per signal input volt, the modulator is typically biased at the point at which the output is one-half of the maximum output signal. This bias point is called quadrature and is typically accomplished by applying a bias voltage. When biased at quadrature, the modulator optical output signal $P_{output}$ is given by $$P_{output} = \frac{P_{input}}{2} \left[ 1 \pm \sin\left(\frac{\pi x}{V_\pi}\right) \right] \quad (1)$$

where $P_{input}$ is the input optical power, $V_\pi$ is a constant characteristic of each modulator, x is the input electrical signal voltage, and the sign (±) depends on the slope of the quadrature point chosen. The nonlinear distortion in the output signal sinusoidal function is usually insignificant if the modulation depth is kept below about 71%. The modulation depth, m, is defined as $$m = \frac{P_{max} - P_{min}}{P_{max} + P_{min}} \quad (2)$$

When x is small, the output signal can be approximated by $$P_{output} = \frac{P_{input}}{2} \left[ 1 + \frac{\pi x}{V_\pi} \right] \quad (3)$$

where the positive sign is taken without loss in generality. This equation can be rewritten as $$P_{output} = P_{excess} + \frac{\pi P_{mod}}{2V_\pi} [x_{average} + x] \quad (4)$$

The second component of the right hand side, is a sum of the signal x, which may be positive or negative, and just enough of the optical carrier $X_{average}$ to ensure the modulation depth of this component does not exceed 100%. The first part of this equation $P_{excess}$ is called "excess carrier" and represents unmodulated optical power. When viewed as a separate optical component, as the equation suggests, this excess carrier increases the signal from a PD since it acts like a coherent high-power local oscillator. However, this signal "gain" is only linearly proportional to the excess carrier power, which is limited by the PD to ~2 mW.

The excess carrier and the dc photocurrent it produces have previously been ignored in optical communications systems because the average power has been less than 1 mW. However, recently, there have been significant advances in (1) laser output power levels, (2) high-speed modulators, (3) optical amplifiers, and (4) small high-speed PDs. Because of the small active volume, high-speed PDs cannot receive more than ~2 mW of optical power before nonlinearities, bandwidth reduction, or catastrophic damage occurs. Therefore high-power (~100 mW) lasers cannot be fully utilized to increase high-speed modulator sensitivity.

In calculating the electrical link loss, for illustration purposes, the input electrical power is set to one-fourth of the half-wave voltage, $V_\pi/4$, which yields a modulation depth of 71%. The electrical input power then is $$P_{\mu W, input} = \frac{\left(\frac{V_\pi}{4}\right)^2}{2R_{input}} \quad (5)$$

where $R_{input}$ is the input resistance. The output power from the PD is calculated from the peak modulation current, $m \cdot I_{PD,aver}$, and is given by $$P_{\mu W, output} = \frac{m^2 I_{PD,aver}^2 R_{LOAD}}{2} \quad (6)$$

where $R_{LOAD}$ is the PD's load resistance. The link loss is the ratio of the output power to the input power. For this illustration reasonable values of $V_\pi$=10 volts and $R_{input}$=$R_{Load}$=50 Ω are utilized. Then, high speed PDs with an average current of ~2 mA, of the link loss given by the equation $$\text{ElectricalSignalLoss(dB)} = 10\log\left[\frac{P_{\mu W, input}}{P_{\mu W, output}}\right] \quad (7)$$

and is approximately 31 dB. This 31 dB loss is undesirable and often intolerable. Furthermore, the 31 dB comes only with high PD currents that result in increased "shot" noise (a term well-known to those practicing in the art) and sensitivity to laser (optical source) relative intensity noise.

Referring to FIG. 1, a ring laser 10 is formed by optically coupling a gain element 12 (such as described in U.S. Pat. No. 5,303,314, Duling et al.), an electro-optic modulator (EOM) 14 (such as a part no. 2424CB manufactured by AT&T Bell Laboratories of Breingsville, Pa.), a frequency selective output coupler (FSOC) 16 (such as, part no. 1550PMC50/50 manufactured by Gould of Millersville, Md. and part no. FFP-TF-1550-010M150-3.0 (PM fiber in/out) manufactured by Micron Optics of Atlanta, Ga.), and an optical isolator is (such as, a part no. I-15-PTM-2 manufactured by Isowave of Dover, N.J.). These elements are coupled in such a way that a ring laser cavity is formed. A more conventional ring laser 10 would be-formed by not including the modulator 14, by using a frequency insensitive output coupler 16, and by selecting the oscillating wavelength of the laser 10 with an additional intracavity element (filter) (not shown). This embodiment differs from the conventional ring laser in that this embodiment couples light out of the laser cavity based on the optical frequency. Also, although polarization-maintaining elements are preferred, elements that are not polarization-maintaining can be used provided polarization control is appropriately utilized.

The FSOC 16 is a three-port optical device that, effectively receives light at an input port 16a and passes a narrowband (or narrowbands) of light out a first output port 16b and directs the remaining optical spectrum out a second output port 16c. The narrowband filter is considered a pass band filter from the FSOC input port 16a to the first output port 16b and considered a reject band (or notch) filter from the FOSC input port 16a to the second output port 16c.

When the gain is sufficient to overcome the ring losses, the laser cavity will oscillate (or lass) with longitudinal modes (carriers) corresponding to the pass band(s) of the FSOC 16. The light needed to start laser oscillations is conventionally provided by the amplified spontaneous emission from the laser gain element 12. The light exiting the first output port 16b of the FSOC 16 is amplified by the gain element 12 and is directed to the EOM 14. The EOM 14 utilizes the RF electrical input 11 to modulate the intensity, phase or frequency of each longitudinal mode of the laser cavity thereby creating optical modulation sidebands (about each longitudinal mode). The FSOC 16 selectively couples the modulation sidebands out of the laser cavity. A portion of the longitudinal modes may not be fully rejected and may also be coupled out of the second output port 16c. The light within the passband(s) of the FOSC 16 constitutes circulating laser light. Unidirectional lasing is assured by incorporating an optical isolator within the ring laser 10 of FIG. 1.

In this way an optical source is formed, which, (1) can be modulated to frequencies nominally limited only by the EOM 14 bandwidths (some EOM 14 bandwidths extend beyond 40 GHz), (2) in comparison to the extracavity modulator designs, reduces the electrical signal input voltage required to produce a given modulation depth, (3) in comparison to an extracavity modulator with subsequent filter (such as that shown in the U.S. Pat. application Ser. No. 08/369,437, entitled *WIDEBAND FIBER-OPTIC SIGNAL PROCESSOR*, Esman et al., filed Jan. 6, 1995), the filter resonance (passband) of the FSOC is inherently locked to the lasing frequency of the laser and the FSOC effectively couples out only the modulation of the laser optical modes and conserves the optical carrier within the laser cavity, (4) by minimizing carrier power, allows efficient use of optical components such as amplifiers and photodetectors (PDs), and (5) since all added components are passive, improves system performance without adding noise.

The optical spectrum for each of the possible laser cavity modes (wavelengths or carriers) is shown for each point in the ring laser in FIGS. 1a through 1d. FIG. 1a shows the optical spectrum at the input port of the frequency selective output coupler. FIG. 1b shows the optical spectrum at the first output of the frequency selective output coupler. FIG. 1c shows the optical spectrum at the second output port of the frequency selective output coupler. FIG. 1d shows the optical spectrum at the output of the polarization maintaining laser gain element.

Entering the EOM 14 there are strong carriers from the gain element 12. The carrier(s) are modulated by the EOM 14, which may be of any type, producing sidebands as shown in FIG. 1a. The FSOC 16 effectively removes the modulation from the optical signal as it passes from the input port 16a to the first output port 16b and outputs the modulated portion (with some residual carrier) at the second output port 16c, as shown in FIG. 1b. The carrier depicted in FIG. 1c continues around the ring cavity, passes through the isolator 18, and is amplified by gain element 12 resulting in a large carrier of FIG. 1d. As shown in FIG. 1b, the modulation depth of the signal exiting the second output port 16c is greater than the modulation depth of the signal exiting the EOM 14. This improves over the device shown in the paper by Esman et al., *Wideband Efficiency Improvement of Fiber Optic Systems by Carrier Subtraction*, IEEE Photonics Tech. Ltrs., Vol. 7, pp. 218–220, Feb. 1995, in that, first, the laser cavity modes (wavelengths) are inherently locked to the filter. That is, since the laser oscillates at wavelengths that experience the lowest round-trip losses, the laser will oscillate at the FSOC 16 passbands and if the FSOC 16 passband drifts in wavelength, so will the laser cavity mode(s). Thus stable long term operation is provided without requiring a feedback system to lock the laser and filter wavelengths. Secondly, with no input modulation applied to the EOM 14 no light is coupled out of the laser cavity. Hence, the circulating laser light will be maximized and thus lead to a larger carrier available for modulation by the EOM 14 and, thus, larger sidebands.

Figure 5:
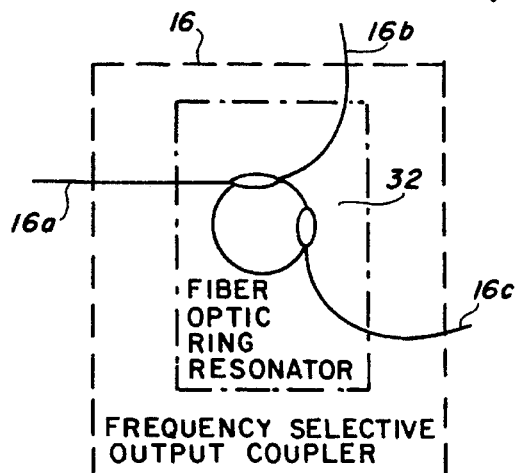
FIG. 5 shows a frequency selective output coupler utilizing a fiber-optic ring resonator.
Figure 6:
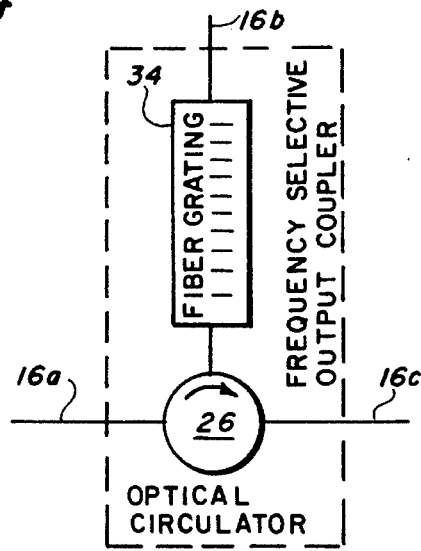
FIG. 6 shows a frequency selective output coupler utilizing an optical circulator and a fiber grating.
Figure 7:
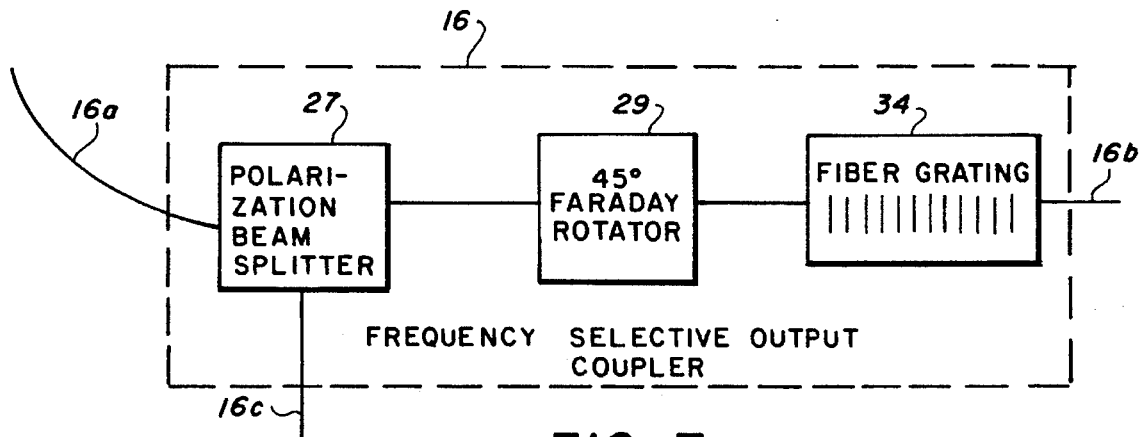
FIG. 7 shows a frequency selective output coupler utilizing a polarization beam splitter in conjunction with a 45° Faraday rotator and a fiber grating.

The preferred embodiment of the FSOC 16 utilizes a narrowband optical Fabry-Perot (FP) filter 22, as shown in FIG. 2. The Fabry-Perot (FP) filter 22 is normally used as a passband filter in the transmission mode but can also be simultaneously used as a notch (reject) filter in the reflection mode. The fiber-pigtailed FP filter 22 has a finesse as high as 150 or more. There are two other principle embodiments of an FSOC 16. First, a fiber optic ring resonator (FORR) filter 32 (as shown in FIG. 5), operates much like a FP filter and exhibits similar filtering characteristics. Secondly, Bragg gratings 34 internal to the optical fiber, as shown in FIGS. 6 and 7, can also be used as the optical frequency sensitive device.

Fiber-optic FP filters 22 are well known to the art and have response characteristics with finesse in the 30–250 range with bandwidths extending from ~50 MHz to 400 GHz and free spectral ranges (FSRs) ranging from 10 GHz to 12,500 GHz.

FORRs 32 are well known to the art and have similar characteristics to the FP filter 22. The resonator transmission, $T(\omega')$, and reflection, $R(\omega')$, versus reduced optical frequency, $\omega'=\omega nL/2\pi c$, is derived by Stokes et al. in the paper entitled *All-single-mode Fiber Resonator*, Optics Ltrs, Vol. 7, No. 1, pp. 288–290, Jan. 1982. The highest known finesse of a passive fiber ring resonator is 1260. See, Yue et al., *Fibre Ring Resonator with Finesse of 1260*, Elect. Ltrs., Vol. 24, No. 10, pp. 622–623, May 1988.

Bragg gratings 34 are also well known to the art in wave diffraction theory. Bragg gratings in semiconductor material form distributed reflectors (DBR) and are used to form laser cavities for what are known as DBR lasers. The Bragg grating transmission, $T(\delta L)$, and reflection, $R(\delta L)$ versus detuning $\delta L$ from the Bragg wavelength and DBR lasers are shown in Agrawal et al., *Long-Wavelength Semiconductor Lasers*, Van Nostrand Reinhold Co., New York, N.Y., 1989. The same principle is used to form wavelength selective reflectors in optical fibers. Optical fiber Bragg gratings have bandwidths ranging from 200 MHz to hundreds of GHz. See, Kawasaki et al., *Narrow-band Bragg Reflectors in Optical Fibers*, Optics Ltrs, Vol. 3, No.2, pp. 66–68, Aug. 1978; and Archambault et al., 100 Reflectivity Bragg Reflectors Produced in Optical Fibres by Single Excimer Laser Pulses, Elect. Ltrs., Vol. 29, No. 5, pp. 453–455, Mar. 1993.

The embodiments of an FSOC 16 are shown in FIGS. 2 through 7. In FIG. 2, the FSOC 16 output coupling is accomplished by the use of a polarization-maintaining fiber optic splitter 24. In FIG. 3, the efficiency of output coupling is improved over that shown in FIG. 2 by utilizing an optical circulator 26 similar to the type reported in Koga et al., *High-Isolation Polarization-Insensitive optical Circulator for Advanced Optical Communications Systems*, J. of Lightwave Tech., Vol. 10, No. 9, pp. 1210–1217, Sep. 92. Also, the circulator 26 operation can be accomplished with a polarization beam splitter (PBS) 27 (such as part no. PB100-2U-15-NC, manufactured by JDS Fitel of Nepean, Ont., Canada) and Faraday rotator 29 (such as part no. HSFR-1550-SS-P (PM fiber in/out) manufactured by Etek of San Jose, Calif.), as shown in FIG. 4. In FIG. 4, the modulated light enters the input port 16a of the FSOC 16 having the polarization of the PM ring laser. The PBS 27 is oriented so that the light passes through to the right and enters the 45° Faraday rotator 29. The Faraday rotator 29 provides a nonreciprocal rotation of the polarization. The modulated light is then filtered by the FP filter 28—the carrier(s) being passed through and constituting the circulating laser light while the reflected modulation sidebands (with some residual carrier) reenter the Faraday rotator 29. The reflected light undergoes a second 45° rotation in the Faraday rotator 29, which yields a double-pass total 90° rotation so that the action of the PBS 27 will cause the reflected light to exit the PBS 27 toward a second output port 16c of the FSOC 16.

There are other designs of the. FSOC 16 that may be desired. One is replacing the FP filter 22 fiber-optic splitter 24 of FIG. 2 with a FORR 32, as shown in FIG. 5; another is replacing the FP filter 28 of FIG. 3 with a fiber Bragg grating 28 (and rearranging the input and output ports 16a and 16b, respectively) as shown in FIG. 6. Further, the FP filter 28 of FIG. 4 may be replaced by a fiber Bragg grating 34, as shown in FIG. 7, which is preferably formed in PM fiber and orientated 45° relative to the input fiber axes of the input port 16a. For both configurations of FIG. 6 and 7, the carrier portion of the optical input to the input port 16a of the FSOC 16 is reflected off the grating 34 and, after two 45° Faraday rotations, is returned to the properly oriented. PM fiber of the laser cavity by the PBS 27 via FSOC 16c. The modulation sidebands are transmitted through the grating to the second output port 16b of the FSOC 16.

This invention provides a unique and novel way to improve the efficiency of electro-optical modulators and consequently reduce the loss in fiber-optic signal processing and communications systems. By appropriate choice of a frequency selective filter (output coupler), modulation can be carried out in almost any input frequency range—for current optical filters, the filter bandwidth can be chosen from 10's of MHz to 100's of GHz. The above-described invention also provides a new way to extract (mainly) optical modulation sideband power, leaving the carrier to circulate in the laser cavity, and reduces the link loss without introducing additional noise such as would be the case utilizing electrical amplifiers. This invention is unique in that the filtering occurs before the carrier is transmitted from a laser source. Unlike electrical amplifiers, this invention offers a very broad-band amplification thereby resulting in a substantial cost saving in the overall link cost over broad-band flat-frequency response electrical amplifiers. Unlike electrical amplifiers, this invention does not perturb the phase of the electrical signal. In comparison to a conventional extracavity modulation technique with the same PD current, this invention provides greater generated electrical power from the PD, hence greater saturated output powers can be obtained from the PD. Since weakly modulated carrier has been substantially removed, other optical components such as optical amplifiers are not saturated by the carrier and so provide additional gain (or utility).

It should be noted that the depth of the FSOC filter (the amount of filtering of the carrier) can be varied by choice and design of filter (e.g., FP, FORR, and grating filters). Extensive removal of the carrier will be advantageous in some applications but will result in nonlinear distortions upon photodetection. It is noted that after fiber-optic processing (e.g., transmission, distribution) that may include optical amplifiers with obvious power limitations, the carrier may be reinserted to minimize these distortions. Also, in the case that the carrier is extensively or completely removed and the amplitude modulation is performed (as in FIG. 1), it is noted that this invention conveniently provides a means to produce the second harmonic of the input signal 11. That is, if the center (carrier) signal of FIG. 1b is extensively removed, then the remaining two sidebands that are separated by twice the input signal frequency constitute the majority of the PD optical input. The PD would then produce an electrical signal at the second harmonic. Lastly, it is noted that this second harmonic (nonlinearity) may be advantageously used to counteract other nonlinearities in fiber optic systems and components. Most notably is the second harmonic distortion introduced by low biasing external modulators as described by Farwell et al., *Increased Linear Dynamic Range by Low Biasing the Mach-Zehnder Modulator*, IEEE Photonics Tech. Ltrs., Vol. 5, pp. 779–782, Jul, 1993.

It is obvious to one practicing the art that optimizing the laser and modulation may include changing the order of the components forming the ring. One may consider placing the gain element between the PBS and the FP filter in the FSOC, in this way, the gain element can be used to amplify the modulated signal. Further, the ring cavity can be formed using bulk optics or combinations of bulk and fiber optics.

What is claimed is:

1. A device comprised of:

means for generating an input processor signal;

means for modulating input optical signals with the input processor signal to produce Output optical signals having optical signals comprised of a continuous wave portion and modulated sideband portion;

means for removing and outputting the modulated sideband portion of the optical signals through as first output port and the continuous wave portion of the optical signals through a second output port;

an optical isolator having an input and output port for receiving the continuous wave portion of the optical signals from the second port of the removing and outputting means thereby assuring single direction lasing and outputting single direction optical signals, respectively; and means for receiving and amplifying the continuous wave optical beam from the optical isolator and feeding back amplified continuous wave optical signals back to said modulating means thereby creating a laser cavity for the continuous wave portion of the optical signals.

2. A device, as in claim 1, wherein the means for removing and outputting is comprised of a polarization maintaining fiber optic splitter and a Fabry-Perot filter.

3. A device, as in claim 1, wherein the means for removing and outputting is comprised of an optical circulator and a Fabry-Perot filter.

4. A device, as in claim 1, wherein said means for removing and outputting is comprised of a polarization beam splitter, a 45° Faraday rotator and a Fabry-Perot filter.

5. A device, as in claim 1, wherein said means for removing and outputting is a three-port fiber optic ring resonator.

6. A device, as in claim 1, wherein said means for removing and outputting is comprised of an optical circulator and a fiber grating.

7. A device, as in claim 1, wherein said means for removing and outputting is comprised of a polarization beam splitter, a Faraday rotator and a fiber grating.

8. A device, as in claim 1, wherein the sidebands of the modulated sideband portion of the optical signals are separated by a frequency equal to twice that of the input processor signals so as to result in an electrical signal at the second harmonic of the processor signal.

9. A device comprised of:

a laser capable of generating one or more continuous wave optical carriers;

an processor signal;

an optical modulator to modulate the continuous wave optical carriers internal to the laser with the processor signal so as to produce one or more modulated optical signals comprised of continuous wave portions and modulated sideband portions with optical modulation sidebands associated with each carrier;

a frequency selective output filter for removing and outputting the modulated portion of the optical signal through a first output port and the continuous wave optical carrier portion of the optical signal through a second output port;

an optical isolator having an input and output port for receiving said continuous wave optical laser beam portion from the second port of the removing and outputting means thereby assuring single direction lasing and outputting the single direction continuous wave optical laser beam, respectively; and a laser gain element for receiving and amplifying the single direction continuous wave optical carriers from the optical isolator and feeding back amplified continuous wave optical carriers back into the optical modulator, thereby producing a ring cavity for laser oscillation of the continuous wave portion of the optical signals.

10. A device, as in claim 9, wherein the optical modulated sidebands associated with each carrier are separated by a frequency equal to twice that of the input processor signal so as to produce an electrical signal from a photodetector means at the second harmonic of the input processor signal.

11. A method for modulating an optical signal comprised of the steps of:

modulating one or more continuous wave optical signals with an input processor signal to produce modulated optical signals with associated carriers and optical sidebands;

filtering the modulated optical signal to remove the optical sidebands portion of the modulated optical signal from a ring laser cavity; and amplifying the continuous wave portion of the modulated optical signal and feeding it back to be again modulated by the input optical signal so as to produce a ring laser cavity and a high input optical power at the optical modulator resulting in sidebands with higher power.

* * * * *